(12) United States Patent
Buisine

(10) Patent No.: US 10,644,351 B2
(45) Date of Patent: May 5, 2020

(54) POLYMER ELECTROLYTE AND ELECTROCHEMICAL DEVICES COMPRISING SAME

(71) Applicant: RHODIA OPERATIONS, Paris (FR)

(72) Inventor: Olivier Buisine, Saint Genis-Laval (FR)

(73) Assignee: RHODIA OPERATIONS, Paris (FR)

( * ) Notice: Subject to any disclaimer, the term of this patent is extended or adjusted under 35 U.S.C. 154(b) by 257 days.

(21) Appl. No.: 15/568,061

(22) PCT Filed: Apr. 20, 2016

(86) PCT No.: PCT/EP2016/058708
§ 371 (c)(1),
(2) Date: Oct. 20, 2017

(87) PCT Pub. No.: WO2016/169955
PCT Pub. Date: Oct. 27, 2016

(65) Prior Publication Data
US 2018/0138548 A1    May 17, 2018

(30) Foreign Application Priority Data

Apr. 21, 2015 (FR) .................. 15 53549

(51) Int. Cl.
| | | |
|---|---|---|
| *H01M 10/0565* | (2010.01) | |
| *G02F 1/15* | (2019.01) | |
| *C08G 77/46* | (2006.01) | |
| *C08K 5/42* | (2006.01) | |

(52) U.S. Cl.
CPC ........ *H01M 10/0565* (2013.01); *C08G 77/46* (2013.01); *C08K 5/42* (2013.01); *G02F 1/15* (2013.01); *C08K 2201/001* (2013.01); *G02F 2001/164* (2019.01); *H01M 2300/0082* (2013.01); *Y02E 60/13* (2013.01)

(58) Field of Classification Search
CPC ...... H01M 10/0565; C08G 77/46; C08K 5/42
See application file for complete search history.

(56) References Cited

U.S. PATENT DOCUMENTS

| | | | |
|---|---|---|---|
| 5,037,712 A | | 8/1991 | Shackle et al. |
| 7,744,772 B2 * | | 6/2010 | Gambut-Garel ........ C08L 83/06 252/62.2 |
| 7,846,581 B2 * | | 12/2010 | Barrandon .............. C08L 83/04 252/62.2 |
| 7,914,931 B2 * | | 3/2011 | Kobayashi .......... H01M 2/1653 29/623.5 |
| 8,293,403 B2 * | | 10/2012 | Gambut-Garel ........ C08L 83/04 429/189 |
| 8,753,775 B2 * | | 6/2014 | Yamaguchi ........... H01M 4/133 429/218.2 |
| 9,923,243 B2 * | | 3/2018 | Gupta ............... H01M 10/0565 |
| 2002/0028388 A1 | | 3/2002 | Lee |
| 2002/0051911 A1 * | | 5/2002 | Okada ..................... C08L 83/04 429/313 |
| 2004/0197668 A1 * | | 10/2004 | Jung ................. H01M 10/0567 429/330 |
| 2006/0102869 A1 | | 5/2006 | Cavaille et al. |
| 2007/0048621 A1 * | | 3/2007 | Kashida ............ H01M 10/0525 429/326 |

FOREIGN PATENT DOCUMENTS

| | | |
|---|---|---|
| FR | 2841255 A1 | 12/2003 |
| WO | 98/18173 A1 | 4/1998 |

OTHER PUBLICATIONS

Effects of Bulky Copolymers on Ion Transport in an Anhydrous Proton-Conducting Electrolyte, Journal of the Electrochemical Society, 157 (11), pp. 1549-1555 (Year: 2010).*

\* cited by examiner

*Primary Examiner* — Matthew J Merkling

(57) ABSTRACT

The invention relates to a polymer electrolyte comprising a silicone polymer bearing pending polyoxyalkylene ether groups, at least one fluorinated salt and a solvent, said solvent representing between 10% and 60% by weight, relative to the total weight of the silicone polymer bearing pending polyoxyalkylene ether groups, of the fluorinated salt and of the solvent, and said solvent comprising at least one polyether solvent. In addition, the invention also relates to a process for producing said polymer electrolyte and to the uses thereof as an electrolyte in an electrochemical device, in particular as an electrolyte in a battery or in an electronic display device, in particular an electrochemical device.

22 Claims, No Drawings

POLYMER ELECTROLYTE AND ELECTROCHEMICAL DEVICES COMPRISING SAME

This application is a U.S. national phase entry under 35 U.S.C. § 371 of International Application No. PCT/EP2016/058708, filed on Apr. 20, 2016, which claims priority to French Application No. 1553549, filed on Apr. 21, 2015. The entire contents of these applications are explicitly incorporated herein by this reference.

TECHNICAL FIELD OF THE INVENTION

The present invention relates to the field of materials that are of use in electrochemical applications. More specifically, this invention relates to a novel polymer material that can be used as an electrolyte.

PRIOR ART

In the very dynamic technical field of batteries, part of the research effort is concentrated on improving the properties of the materials constituting the electrolyte.

Polymer electrolytes have already shown advantages, in particular in terms of safety. Polyoxyethylene polymer electrolytes are in particular known. However, these polymers have the drawback of having a relatively low conductivity, in particular at ambient temperature or at low temperature. In order to solve this problem, polymer electrolytes of polyorganosiloxane (or more familiarly of silicone) bearing polyoxyethylene groups have been proposed in international patent applications WO 2004/091033, WO 2004/090037 and WO 2004/090038. It is however noted that the new materials still have relatively low ionic conductivities: the examples describe ionic conductivities measured at 25° C. of between $10^{-4}$ and $5.10^{-6}$ Siemens/cm.

It is in this context that the inventors have sought to improve these materials. It is desired to have a polymer material which has an ionic conductivity greater than $10^{-4}$ Siemens/cm. Preferably, the conductivity of this material is high at ambient temperature, or even at low temperature. In addition, this material can advantageously have one or more of the following properties:

This material has good properties both in terms of ionic conductivity and in terms of mechanical properties.
This material is transparent.
This material is easy and inexpensive to produce.

BRIEF DESCRIPTION OF THE INVENTION

A subject of the invention is a polymer electrolyte comprising a silicone polymer bearing pendant polyoxyalkylene ether groups, at least one fluorinated salt and a solvent, said solvent representing between 10% and 60% by weight, relative to the total weight of the silicone polymer bearing pendant polyoxyalkylene ether groups, of the fluorinated salt and of the solvent, and said solvent comprising at least one polyether solvent.

In addition, a subject of the invention is also a process for producing said polymer electrolyte, comprising the steps in which a precursor composition comprising the precursor(s) of said silicone polymer, if necessary a polymerization and/or crosslinking catalyst, said fluorinated salt and said solvent is obtained; then said precursor composition is subjected to a polymerization and/or crosslinking treatment. The precursor composition is also a subject of the present invention.

Finally, the invention relates to the uses of said polymer electrolyte as an electrolyte in an electrochemical device, in particular as an electrolyte in a battery or in an electronic display device, in particular an electrochemical device.

DESCRIPTION OF THE INVENTION

In the following description, the expression "between . . . and . . . " should be understood as including the mentioned limits.

A subject of the present invention is a polymer material that can be used as an electrolyte. This material comprises at least one silicone polymer bearing pendant polyoxyether groups, a fluorinated salt and a solvent.

In the present invention, the expression "silicone polymer bearing pendant polyoxyalkylene ether groups" refers to the polymers as described in particular in international patent applications WO 2004/091033, WO 2004/090037 and WO 2004/090038. The silicone polymer according to the invention can be defined as a polyorganosiloxane (or POS) polymer having at least one pendant group directly bonded to a silicon atom comprising a polyoxyalkylene ether function. The expression "pendant group" means a group occurring as a side group on the polymeric backbone and not a group in the polymeric backbone itself.

Said group comprising a polyoxyalkylene ether function can be represented by the general formula —R-POA, in which:

R represents a chemical bond or a radical comprising from 1 to 50 carbon atoms;
POA represents a polyoxyalkylene ether group, preferably selected from the group consisting of a polyoxyethylene ether group and of a polyoxypropylene ether group.

The number of oxyalkylene units in the polyoxyalkylene ether function may be between 1 and 40, preferably between 2 and 20, more preferably between 3 and 15, and even more preferably between 5 and 12. Said group comprising a polyoxyalkylene ether function may in particular be selected from the group consisting of:

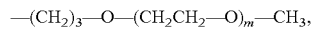

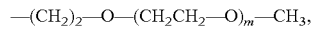

m representing an integer between 1 and 40, preferably between 2 and 20, more preferably between 3 and 15, and even more preferably between 5 and 12.

The silicone polymer may optionally bear other functional groups directly bonded to a silicon atom. This or these group(s) may be independently selected from the group consisting of a hydrogen atom, a hydroxyl group, a linear or branched $C_1$ to $C_8$ alkyl group, a linear or branched $C_1$ to $C_8$ alkenyl group, a $C_5$ to $C_8$ cycloalkyl group, a $C_6$ to $C_{12}$ aryl group, and a ($C_6$ to $C_{12}$)aryl($C_1$ to $C_8$)alkyl group, each alkyl, alkenyl, cycloalkyl and aryl group possibly being un-substituted or substituted one or more times with a halogen atom, with a $C_1$ to $C_4$ alkyl group, with a $C_1$ to $C_4$ alkoxy group and/or with a hydroxyl group.

According to one embodiment, the silicon polymer of the present invention may be a statistic or block copolymer comprising the following motifs:

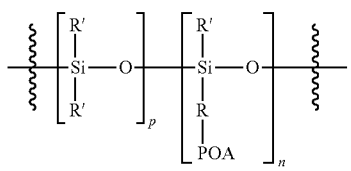

wherein R and POA have the meanings as defined above, R' represents a hydrogen atom, a hydroxyl group, a linear or branched $C_1$ to $C_8$ alkyl group, a linear or branched $C_1$ to $C_8$ alkenyl group, a $C_5$ to $C_8$ cycloalkyl group, a $C_6$ to $C_{12}$ aryl group, and a $(C_6$ to $C_{12})$aryl$(C_1$ to $C_8)$alkyl group, each alkyl, alkenyl, cycloalkyl and aryl group possibly being un-substituted or substituted one or more times with a halogen atom, with a $C_1$ to $C_4$ alkyl group, with a $C_1$ to $C_4$ alkoxy group and/or with a hydroxyl group, p is a number of between 1 and 200 and n is a number of between 1 and 100.

The silicone polymer according to the invention is preferably obtained by polymerization and/or crosslinking of an initial composition, termed "precursor composition", which comprises the precursor(s) of said silicone polymer and, if necessary, a polymerization and/or crosslinking catalyst.

According to a first embodiment, the silicone polymer according to the invention is preferably obtained by hydrosilylation reaction between hydrosilylated (Si—H) groups and unsaturated groups. According to this embodiment, the precursor composition comprises at least one polyorganosiloxane A comprising, per molecule, in addition to the polyoxyalkylene ether groups, at least two $C_2$ to $C_6$ alkenyl groups bonded to the silicon, at least one polyorganosiloxane B comprising, per molecule, at least two hydrogen atoms bonded to the silicon, and at least one hydrosilylation catalyst. Among the catalysts known for initiating hydrosilylation reactions, mention may be made of platinum-based, ruthenium-based or rhodium-based catalysts.

According to a second embodiment, the silicone polymer according to the invention is preferably obtained by dehydrogenative condensation reaction between hydrosilylated (Si—H) groups and hydroxylated (Si—OH) groups. According to this embodiment, the precursor composition comprises at least one polyorganosiloxane A comprising, per molecule, in addition to the polyoxyalkylene ether groups, at least two hydrogen atoms bonded to the silicon, at least one polyorganosiloxane B comprising, per molecule, at least two hydroxyl —OH groups directly bonded to the silicon, and at least one dehydrogenative condensation catalyst. Among the catalysts known for initiating dehydrogenative condensation reactions, mention may be made of rhodium-based, platinum-based, palladium-based, plutonium-based and iridium-based catalysts, alkali-based catalysts, amine-based catalysts, colloidal nickel-based catalysts, boron-based catalysts and tin-based catalysts.

According to a third embodiment, the silicone polymer according to the invention is preferably obtained by cationic polymerization and/or condensation reaction between epoxy functions. According to this embodiment, the precursor composition comprises at least one polyorganosiloxane A comprising, per molecule, in addition to the polyoxyalkylene ether groups, at least two groups comprising an epoxy function and at least one cationic photoinitiator. Among the cationic photoinitiators known for initiating said polymerization or crosslinking reactions, mention may be made of onium borates, in particular iodonium borates, and borates of organometallic salts.

The silicone polyether may represent between 10% and 90% by weight of the total weight of the polymer electrolyte which is the subject of the present invention, more preferably between 20% and 80%, and even more preferably between 35% and 70%.

In addition, in the polymer electrolyte according to the invention, the ratio between the number of moles of oxygen atoms in the pendant polyoxyether groups and the number of moles of the fluorinated salt may preferably be of between 15 and 50, and even more preferably between 15 and 45.

The polymer electrolyte according to the invention also comprises at least one fluorinated salt. The electrolyte according to the invention may contain a single fluorinated salt. However, it is not excluded in the context of this invention to use a mixture of several fluorinated salts consisting of different anions and/or of different cations. The fluorinated salt may consist of a fluorinated monoanion or polyanion and of one or more cations. The cation(s) may be selected, independently of one another, from metal cations and organic cations. As metal cation, mention may preferably be made of alkali metal cations, alkaline-earth metal cations and cations of d-block elements. As organic cation, mention may be made of imidazolium cations, pyrrolidinium cations, pyridinium cations, guanidinium cations, ammonium cations and phosphonium cations. According to one preferred embodiment, the fluorinated salt comprises at least one alkali metal cation, preferentially at least one lithium or sodium cation, and more preferentially at least one lithium cation. Said fluorinated salt may be a fluorinated lithium salt or a fluorinated sodium salt, preferably a fluorinated lithium salt.

Among the fluorinated anions that can be used in the present invention, fluorinated sulfonimide anions may be advantageous. The fluorinated anion may in particular be selected from the anions having the following general formula:

$$(Ea\text{-}SO_2)N^-R$$

in which:
Ea represents a fluorine atom or a group having preferably from 1 to 10 carbon atoms, selected from fluoroalkyls, perfluoroalkyls and fluoroalkenyls,
R represents a substituent.

According to a first embodiment, R represents a hydrogen atom.

According to a second embodiment, R represents a linear or branched, cyclic or non-cyclic hydrocarbon-based group, preferably having from 1 to 10 carbon atoms, which can optionally bear one or more unsaturations, and which is optionally substituted one or more times with a halogen atom or with a nitrile function.

According to a third embodiment, R represents a sulfinate group. In particular, R may represent the group —SO$_2$-Ea, Ea being as defined above. In this case, the fluorinated anion may be symmetrical, i.e. such that the two Ea groups of the anion are identical, or non-symmetrical, i.e. such that the two Ea groups of the anion are different. Moreover, R may represent the group —SO$_2$—R', R' representing a linear or branched, cyclic or non-cyclic hydrocarbon-based group, preferably having from 1 to 10 carbon atoms, which is optionally substituted one or more times with a halogen atom and which can optionally bear one or more unsaturations. In particular, R' may comprise a vinyl or allyl group. Furthermore, R may represent the group —SO$_2$—N$^-$R', R' being as defined above or else R' represents a sulfonate function —SO$_3^-$.

According to a fourth embodiment, R represents a carbonyl group. R may in particular be represented by the formula —CO—R', R' being as defined above.

The fluorinated anion that can be used in the present invention may advantageously be selected from the group consisting of:

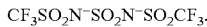

The fluorinated anions that can be used in the present invention may also be selected from the group consisting of $PF_6^-$, $BF_6^-$, $AsF_6^-$, fluoroalkyl borates, fluoroalkyl phosphates, and fluoroalkyl sulfonates, in particular $CF_3SO_3^-$.

According to one particular embodiment, the fluorinated anion in the present invention has a functional group capable of reacting with the silicone polymer bearing pendant polyoxyalkylene ether groups. For example, when the silicone polymer according to the invention is obtained by cationic polymerization and/or condensation reaction between epoxy functions, the fluorinated anion in the present invention may have at least one epoxide functional group.

Generally, the fluorinated salt according to the invention can be described by the overall formula below:

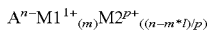

in which:
A represents a fluorinated anion;
M1 and M2 represent cations;
n, l and p, independently selected between 1 and 5, represent respectively the charges of the fluorinated anion, of the cation M1 and of the cation M2;
m, selected between 1 and 2, represents the stoichiometry of the cation M1.

The fluorinated anion A and the cations M1 and M2 may be as preferentially described above.

The fluorinated salt that can be used in the present invention may advantageously be selected from the group consisting of lithium bis(trifluoromethanesulfonyl)imide of formula $(CF_3SO_2)_2NLi$ (commonly denoted LiTFSI) and lithium bis(fluorosulfonyl)imide of formula $(F—SO_2)_2NLi$ (commonly denoted LiFSI).

Moreover, it is not excluded for the fluorinated salt used in the present invention to be in the form of a eutectic mixture comprising a fluorinated salt and an organic compound forming a eutectic mixture with said fluorinated salt.

The fluorinated salt may represent between 30% and 80% by weight of the total weight of the polymer electrolyte which is the subject of the present invention, more preferably between 35% and 70%, and even more preferably between 40% and 60%.

The polymer electrolyte according to the invention also comprises a solvent. Said solvent represents between 10% and 60% by weight, relative to the total weight of the silicone polymer bearing pendant polyoxyalkylene ether groups, of the fluorinated salt and of the solvent. Preferably, said solvent represents between 20% and 50%, more preferably between 25% and 45% by weight. The choice of the amount of solvent required in the polymer electrolyte according to the invention advantageously makes it possible to obtain a material which has good ionic conductivity.

Said solvent comprises at least one polyether solvent. In the present disclosure, the expression "polyether solvent" denotes dimethyl ether monoethylene and polyethylene compounds, (oligo)siloxane polyether compounds, and polyether compounds with chain terminations selected from $C_{2-6}$ alky groups and halogenated or un-halogenated ester groups, for example $CF_3COO—$, $HCF_2COO—$, $HCF_2CF_2COO—$, $CF_3CF_2CF_2COO—$, and $ClCF_2COO—$.

The solvent according to the invention may be selected from the group consisting of dimethoxyethane (DME), diglyme, triglyme, tetraglyme, (oligo)siloxane polyether compounds, perfluoropolyethers (PFPEs), and mixtures thereof in any proportion. Among the (oligo)siloxane polyether compounds, preference is given to polyorganosiloxane compounds having at least one group directly bonded to a silicon atom, comprising a polyoxyalkylene ether function, the total molecular weight of which is less than or equal to 1500 g/mol, preferably less than or equal to 800 g/mol. Preferably, the polyorganosiloxane compound is a diorganosiloxane, and the solvent may be selected from the compounds of formula:

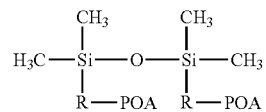

in which —R-POA represents a group comprising a polyoxyalkylene ether function as defined above.

The solvent according to the invention may be a polyether solvent, a mixture of several polyether solvents, or a mixture of one or more polyether solvents with other organic or mineral solvents.

Moreover, the polymer electrolyte which is the subject of the present invention may comprise one or more additives. The additives used may be of organic, mineral or hybrid nature.

The polymer electrolyte which is the subject of the present invention may comprise one or more texturing agents. In the disclosure which follows, the expression "texturing agent" denotes an agent capable of modifying the mechanical properties of a material, and includes, for example, fluidifying agents, gelling agents and curing agents. Said texturing agent may be a polymer. It may be selected from the group consisting of polyethylene, polypropylene, polystyrene, fluoropolymers, for instance PVDF (polyvinylidene fluoride), PTFE (polytetrafluoroethylene), perfluoropolyethers (PFPEs) and copolymers thereof, for instance the PVDF-HFP (polyvinylidene fluoride-hexafluoropropylene) copolymer, poly(meth)acrylates, for instance PMMA (polymethyl acrylate), a polysaccharide or a derivative thereof, for instance cellulose, cellulose acetate, lignin and guar gum, a gelatin and a one-, two- or three-dimensional polysiloxane. Said texturing agent can be inert or else it can contain residues and/or chemical functions that can interact with one or more compounds of the medium. The texturing agent may be in liquid or solid form. When it is a solid additive, the size of this solid additive can range from a few nanometres to several hundred microns. Typically, the texturing agent(s) may represent between 0.1% and 60% by weight of the total weight of the polymer electrolyte which is the subject of the present invention, more preferably between 10% and 60%, and even more preferably between 30% and 50%.

The polymer electrolyte which is the subject of the present invention may further comprise a solide plasticizer. Succinonitrile (SCN) may be used as solid plasticizer, as disclosed in the scientific publication of M. Echeverri et al ("Ionic conductivity in Relation to Ternary Phase Diagram of Poly(ethylene oxide), Succinonitrile and Lithium Bis (trifluoromethane)sulfonimide Blends", Macromolecules, 2012, 45, 6068-6077). Alternatively, solid plasticizer may be selected from the fluoro-amide compounds. In this text, the expression "fluoro-amide compound" refers to a compound having at least one amide functional group and at least one fluorine atom. It can be cited, for example, N-methyl-trifluoroacetamide, N-methyl-trifluorosulfonamide, N,N'-bis (trifluoroacetamide) ethane-1,2-diamine and N,N'-bis(trifluorosulfonamide) ethane-1,2-diamine.

Furthermore, the polymer electrolyte which is the subject of the present invention may comprise one or more mineral fillers. Said mineral filler may be selected from the group consisting of hydrophilic silica, hydrophobic silica, in particular fumed silicas, alumina, silicates, for example mica, metal oxides, hydroxides, phosphates, sulfides, nitrates and carbonates, such as, for example, a cerium oxide, a rare earth oxide, zinc oxide, titanium oxide, tin oxide, indium tin oxide and mixtures thereof. The size of the mineral filler can range from a few nanometres to several hundred microns. Preferably, the mineral fillers contained in the polymer electrolyte according to the invention are nanofillers. This advantageously makes it possible to obtain a material which has better mechanical properties and which is optionally transparent. Typically, the mineral filler(s) may represent between 0.1% and 60% by weight of the total weight of the polymer electrolyte which is the subject of the present invention. When it is a question of nanofillers, these nanofillers may more preferentially represent between 0.1% and 10% by weight of the total weight of the polymer electrolyte. When it is a question of fillers of larger sizes, they may more preferentially represent between 10% and 60% by weight of the total weight of the polymer electrolyte.

Preferably, the polymer electrolyte which is the subject of the present invention may comprise one or more texturing agents in combination with one or more mineral fillers.

Other types of additives may be included in the polymer electrolyte which is the subject of the present invention. However, it is preferable for the total amount of additives present in the electrolyte to represent at most 70% by weight, relative to the total weight of the polymer electrolyte which is the subject of the present invention, more preferably between 0% and 50% and even more preferably between 0% and 40%.

The additives may in particular be selected from the additives conventionally used in battery electrolytes, for example SEI controlling additives, monofluoroethylene carbonate, difluoroethylene carbonate. Pigments may also be used as additives, in particular when the electrolyte according to the invention is intended to be used in an electrochemical device.

The process for producing a polymer electrolyte is also a subject of the present invention. This process comprises the steps of:
obtaining a precursor composition comprising the precursor(s) of said silicone polymer, if necessary a polymerization and/or crosslinking catalyst, said fluorinated salt and said solvent; then
subjecting said precursor composition to a polymerization and/or crosslinking treatment.

Alternatively, the process for producing a polymer electrolyte comprises the steps of:
obtaining a precursor composition comprising the precursor(s) of said silicone polymer, if necessary a polymerization and/or crosslinking catalyst, and said fluorinated salt;
subjecting said precursor composition to a polymerization and/or crosslinking treatment in order to obtain said silicone polymer;
impregnating said silicone polymer with the solvent.

In order to obtain the precursor composition according to one or other of the embodiments, the various compounds can be mixed in an appropriate device. If necessary, the additive(s) can be added at any step of the preparation of said precursor composition, but preferably before the polymerization and/or crosslinking treatment.

The polymer electrolyte according to the invention is obtained by subjecting said precursor composition to a polymerization and/or crosslinking treatment. This treatment may be selected by those skilled in the art according to the polymerizable and/or crosslinkable compound chosen. The polymerization and/or crosslinking treatment may be selected from the group consisting of a heat treatment, a photochemical treatment, in particular a UV treatment, a treatment with an electron beam or with a radioelement beam, a chemical treatment, and a combination of these treatments.

According to a first preferred embodiment, the silicone polymer according to the invention is obtained by hydrosilylation reaction between hydrosilylated (Si—H) groups and unsaturated groups. The polymerization and/or crosslinking treatment consists of a heat treatment.

According to a second embodiment, the silicone polymer according to the invention is obtained by dehydrogenative condensation reaction between hydrosilylated (Si—H) groups and hydroxylated (Si—OH) groups. The polymerization and/or crosslinking treatment consists of a heat treatment.

According to a third embodiment, the silicone polymer according to the invention is preferably obtained by cationic polymerization and/or condensation reaction between epoxy functions. The polymerization and/or crosslinking treatment consists of a photochemical treatment.

One more preferred embodiment consists of a photochemical treatment, this type of treatment advantageously not requiring a metal catalyst. The treatment advantageously consists of a crosslinking under UV of epoxide functions by means of a UV lamp and of at least one photoinitiator present in the silicone polymer precursor composition. The UV lamps most widely used are medium-pressure or low-pressure mercury lamps. The photoinitiators can typically be iodonium or sulfonium derivatives which decompose under UV radiation in acid which initiates the polymerization reaction.

Before carrying out the treatment step, the precursor composition can be shaped. This shaping step can, for example, consist of a step of depositing on a support, so as to obtain a film. This support may be an inert substrate, with a view to obtaining an electrolyte in the form of a self-supported film. Alternatively, said support may be a preformulated electrode, with a view to obtaining an electrolyte in the form of a coating. Alternatively, the precursor composition can be deposited or injected into a mold or into a device.

The preparation process according to the invention may also comprise one or more post-treatment steps. In particular, said process may comprise an aging step, also termed terminating or maturing step. This aging treatment may consist of a heat treatment or else of a pause time under controlled temperature and humidity conditions.

Generally, the process for producing a polymer electrolyte according to the invention can be carried out in a room with controlled hygrometry. All the raw materials preferably have a controlled water content.

This production process can be continuous or batchwise. In batchwise mode, the electrolyte according to the invention can be produced in batches according to conventional methods. However, for a large-scale production, a continuous production process can be envisioned. Each step of the process (in particular the steps of preparing the precursor composition, of shaping and of polymerization and/or condensation and crosslinking treatment) can be independently carried out continuously or non-continuously. For example, the preparation of the precursor composition can be carried out industrially by means of extruders or static mixers, then the film-forming can be obtained by laminating or dipping, and the polymerization and/or crosslinking treatment can finally be obtained by passing under industrial lamps or through a furnace.

The product obtained by means of this production process is a polymer material which can advantageously be used as an electrolyte. Indeed, this material has an ionic conductivity advantageously greater than $10^{-5}$, preferentially greater than $10^{-4}$ and even more preferentially greater than $10^{-3}$ Siemens/cm at 20° C. Preferably, the ionic conductivity is between $5.10^{-4}$ and $10^{-2}$ Siemens/cm at 20° C. Furthermore, this material can advantageously have an ionic conductivity greater than $10^{-6}$, preferentially greater than $10^{-5}$ Siemens/cm at 0° C. In addition, this material can advantageously have an ionic conductivity greater than $5.10^{-4}$ Siemens/cm at 40° C. The ionic conductivity can be measured by the complex impedance spectrometry technique which makes it possible to measure the resistance and the capacity of a solid material. For this, the sample is held between two metal electrodes which are connected to an impedance meter which makes it possible to carry out the measurement. These measurements are carried out at a controlled temperature. Furthermore, the material obtained according to the invention is advantageously electrochemically stable.

In addition, the material obtained may advantageously be solid. In the disclosure which follows, the expression "solid" denotes in particular a material having a Young's modulus of at least 1 MPa. The Young's modulus of the material can be calculated from the stress/strain curve of the material obtained by dynamic mechanical analysis. This electrolyte can therefore advantageously be a self-supported or free standing film, i.e. it can exist and be handled without a support, unlike for example a coating or a gel injected into a porous support. It can in particular be used without an additional separator. Nevertheless, it is not excluded in the present invention to use this material with a separator, for example with a woven or nonwoven and/or microporous separator.

According to one preferred embodiment, the polymer electrolyte according to the invention can be in the form of a film, the thickness of which can be between 1 µm (micrometer) and 1 mm, preferably between 1 µm and 100 µm, and more preferably between 1 µm and 40 µm. Advantageously, the thickness of the film may be uniform over its entire surface area. In the present disclosure, the expression "uniform" denotes a variation in the thickness of the film of less than or equal to 50%, preferably less than or equal to 20%. The surface area of this film may be greater than 25 cm$^2$, or even greater than 100 cm$^2$, up to several hundred square metres in the case of a continuous production.

According to one particularly advantageous embodiment, the polymer electrolyte according to the invention is transparent. In this case, the electrolyte preferably contains no additive that can harm the transparency of the product.

The invention advantageously provides an electrolyte material which has both a strong conductivity and good mechanical properties. In addition, this material is easy to produce and inexpensive.

The polymer electrolyte according to the invention can advantageously be used as an electrolyte in an electrochemical device, and more particularly in electronic display devices or in energy storing and releasing devices. The polymer electrolyte according to the invention can, for example, be used as an electrolyte in one of the following electrochemical devices:

- electrochromic devices: car windows or windows in houses, visors, eyeglasses, etc.,
- electrochromic flat screens: televisions, tablets, smartphones, connected devices, etc.,
- secondary lithium batteries, batteries of lithium-sulfur type, lithium-air batteries, sodium batteries, etc.,
- supercapacitors, in particular double-layer supercapacitors using an electrolyte;
- energy generators, such as solar panels of organic type (known under the abbreviation OPV).

A subject of the present invention is a battery comprising an anode, a cathode and a polymer electrolyte as defined above. Advantageously, such a battery does not contain an additional separator. Nevertheless, a battery containing a separator, for example with a woven or nonwoven and/or microporous separator, is not excluded in the present invention. The cathode must be reformulated so as to be compatible with this electrolyte. Furthermore, the polymer electrolyte according to the invention may be part of the composition of the anode and/or of the cathode.

A subject of the present invention is also an electronic display device, in particular an electrochromic device, comprising at least one polymer electrolyte as defined above. This use is made possible by the fact that the polymer electrolyte according to the invention can advantageously be transparent.

The invention will now be described by means of the following examples given by way of nonlimiting illustration of the invention.

EXAMPLES

Step a: Synthesis of the Silicone Polymer $MD_{32}D^{(OE)}{}_{27}D^{(VCMX)}23T_{0.7}M$ 70.4 g of xylene and 32 mg of Karstedt Platinum were introduced into a 250 ml reactor (jacketed, equipped with a stirrer). The reaction medium was heated to a temperature of T=80° C. with stirring and under a nitrogen atmosphere. When the temperature of 80° C. was reached, the following reagents were added by running in simultaneously over the course of 1.5 hours:

- 70.26 g (0.166 mol) of Uniox®MA300 allyl polyether from the company NOF Corporation;
- 40.20 g (0.008 mol of product, i.e. 0.40 SiH units) of silicone oil bearing an SiH function, of structure $MD'_{50}D_{25}M$.

An analysis by $^1$H NMR made it possible to monitor the progress of the reaction. When the degree of conversion of the silane SiH functions reached 40%, 44.60 g (0.36 mol) of vinylcyclohexane oxide were added. The reaction was left for 2 hours at 86° C. with stirring in order to have a degree of conversion of 100%.

After a return to ambient temperature, the reaction medium was diluted with xylene. Carbon black was added and the whole mixture was stirred for one hour. The medium was then filtered on Clarcel®. Evaporation at 110° C. and under 1 mbar in a rotary evaporator made it possible to remove the volatile compounds. 145 g of the desired silicone polymer, also called polyorganosiloxane, are obtained in the form of a viscous oil having the average structure $MD_{32}D^{(OE)}{}_{27}D^{(VCMX)}23T_{0.7}M$.

In the present text, $M=(CH_3)_3SiO_{1/2}$, $D=(CH_3)_2SiO_{2/2}$, $D^{(OE)}=(CH_3)R^1SiO_{2/2}$, $D^{(VCMX)}=(CH_3)R^2SiO_{2/2}$, $D'=(CH_3)HSiO_{2/2}$ and $T=(CH_3)SiO_{3/2}$, with $R^1=-(CH_2)_3-O-(CH_2CH_2O)_{8-9}-CH_3$

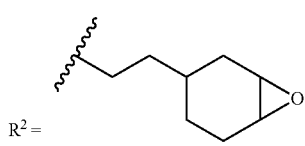

$R^2 =$

Step b: Formulation with the Lithium Salt

The silicone polymer obtained in the previous step (7.0 g), LiTFSI (1.95 g) and triglyme (6 g) were homogenized at ambient temperature. PVDF (5 g) was then added and the whole mixture was left to stir for one hour.

0.37 g of a catalytic system (mixture of 4-isopropyl-4'-methyldiphenyliodonium tetrakis(pentafluorophenyl)borane (22 g), of 1-chloro-4-propoxythioxanthone (4 mg) and of methyl-1,2,2,6,6-pentamethyl-4-piperidyl sebacate (80 mg) in solution in 77.9 g of bis[2-(3,4-epoxycyclohexyl)ethyl] tetramethyldisiloxane) was added to the mixture of silicone polymer, LiTFSI and triglyme previously prepared.

Step c: Shaping of the Preparation

The preparation obtained in step b was placed on a sheet of aluminum 30 μm thick, and then spread using a BYK automatic film applicator. A gauge makes it possible to set the height of the preparation at 200 μm. A noncrosslinked film having a constant thickness was thus obtained.

Step d: Crosslinking

The crosslinking was carried out under UV irradiation using a LumenDynamics Omnicure® S1000 device equipped with a medium-pressure mercury lamp having a power of 100 W. The lamp was placed at a height of 50 cm above the film. The irradiation was maintained for 2 minutes at full power.

Step e: Measurement of the Resistivity

The resistivity measurement was carried out with an Impedance/Gain-Phase Analyzer S1 1260 device sold by SOLARTRON. The measurement frequency ranges from 1 Hz to 1 MHz with a variation of 10 Hz per point. The measuring cell has a surface area of $S=0.196$ cm$^2$. The sample was placed between the two electrodes at a temperature of $T=23°$ C. and subjected to the analysis protocol as defined above. The conductivity measurement measured is $5.10^{-4}$ S/cm.

Step f: Measurement of the Mechanical Properties

The measurement of the solidity of the film obtained was carried out by compression using superposed films in order to obtain a test specimen with a thickness greater than 1 mm. The cylindrical test specimens were cut out using a hole punch with a diameter between 5 and 15 mm. The tests were carried out by dynamic mechanical analysis on a Rheometrics RSA 2 device which makes it possible to apply a sinusoidal strain and to measure the corresponding force. The modulus measured is the tangent to the stress/strain curve for a strain of 1% at a frequency of 1 Hz and a temperature of 23° C. The Young's modulus of this film thus determined leads to a value of 7 MPa.

Step g: Measurement of Electrochemical Stability

The electrochemical stability measurement was carried out in a sealed measuring cell mounted under dry argon, having a surface area $S=1.13$ cm$^2$. The membrane is brought into contact with a 316 stainless steel electrode and a lithium electrode, said electrode acting as counter electrode and as reference electrode. The potential variation is carried out at a rate of 1 mV/s by a VMP3 potentiostat sold by the company biologic, between an upper limit of 4 V and a lower limit of 0 V relative to the lithium reference. The current is measured with a sensitivity of 10 μA. No oxidation or reduction peak was detected in the range considered, thereby reflecting the absence of degradation of the membrane.

The invention claimed is:

1. A polymer electrolyte comprising a silicone polymer bearing pendant polyoxyalkylene ether groups, at least one fluorinated salt and a solvent, said solvent representing between 10% and 60% by weight, relative to the total weight of the silicone polymer bearing pendant polyoxyalkylene ether groups, of the fluorinated salt and of the solvent, and said solvent comprising at least one polyether solvent; wherein the silicone polymer is a statistic or block copolymer comprising the following motifs:

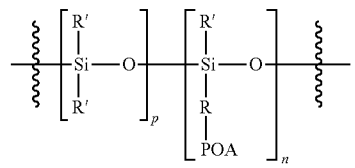

wherein
R represents a chemical bond or a radical comprising from 1 to 50 carbon atoms;
POA represents a polyoxyalkylene ether group;
R' represents a hydrogen atom, a hydroxyl group, a linear or branched $C_1$ to $C_8$ alkyl group, a linear or branched $C_1$ to $C_8$ alkenyl group, a $C_5$ to $C_8$ cycloalkyl group, a $C_6$ to $C_{12}$ aryl group, and a ($C_6$ to $C_{12}$)aryl($C_1$ to $C_8$)alkyl group, each alkyl, alkenyl, cycloalkyl and aryl group being un-substituted or substituted one or more times with a halogen atom, with a $C_1$ to $C_4$ alkyl group, with a C1 to C4 alkoxy group and/or with a hydroxyl group;
p is a number of between 1 and 200; and
n is a number of between 1 and 100.

2. The polymer electrolyte according to claim 1, wherein the fluorinated salt comprises at least one alkali metal cation.

3. The polymer electrolyte according to claim 2, wherein the fluorinated salt comprises at least one lithium cation.

4. The polymer electrolyte according to claim 1, wherein the fluorinated salt comprises at least one fluorinated anion selected from fluorinated sulfonimide anions.

5. The polymer electrolyte according to claim 4, wherein the fluorinated salt comprises at least one fluorinated anion selected from the anions having the following general formula:

(Ea-SO$_2$)N$^-$R in which:
Ea represents a fluorine atom or a group, selected from fluoroalkyls, perfluoroalkyls and fluoroalkenyls,
R represents a substituent.

6. The polymer electrolyte according to claim 4, wherein the fluorinated salt comprises at least one fluorinated anion selected from the group consisting of:

CF$_3$SO$_2$N$^-$SO$_2$CF$_3$,

CF$_3$SO$_2$N$^-$SO$_2$F,

FSO$_2$N$^-$SO$_2$F, and

CF$_3$SO$_2$N$^-$SO$_2$N$^-$SO$_2$CF$_3$.

7. The polymer electrolyte according to claim 1, wherein the solvent is selected from the group consisting of dimethoxyethane (DME), diglyme, triglyme, tetraglyme, (oligo) siloxane polyether compounds, perfluoropolyethers (PFPEs), and mixtures thereof in any proportion.

8. The polymer electrolyte according to claim 1, wherein the polyoxyalkylene ether groups are selected from the group consisting of:

—(CH$_2$)$_3$—O—(CH$_2$CH$_2$—O)$_m$—CH$_3$,

—(CH$_2$)$_2$—O—(CH$_2$CH$_2$—O)$_m$—CH$_3$,

—(CH$_2$)$_3$—O—(CH(CH$_3$)—CH$_2$—O)$_m$—CH$_3$,

—(CH$_2$)$_2$—O—(CH(CH$_3$)—CH$_2$—O)$_m$—CH$_3$, m representing an integer between 1 and 40.

9. The polymer electrolyte according to claim 1, wherein the silicone polymer bearing pending polyoxyalkylene ether groups is obtained by cationic polymerization and/or condensation reaction between epoxy functions.

10. The polymer electrolyte according to claim 1, wherein the silicone polymer is obtained by hydrosilylation reaction between hydrosilylated groups and unsaturated groups.

11. The polymer electrolyte according to claim 1, wherein the silicone polymer is obtained by dehydrogenative condensation reaction between hydrosilylated (Si—H) groups and hydroxylated (Si—OH) groups.

12. The polymer electrolyte according to claim 1, wherein it has a Young's modulus of at least 1 MPa.

13. The polymer electrolyte according to claim 1, wherein it has an ionic conductivity advantageously greater than 10$^{-5}$ siemens/cm at 20° C.

14. The polymer electrolyte according to claim 1, wherein it has an ionic conductivity greater than 10$^{-6}$ siemens/cm at 0° C.

15. The polymer electrolyte according to claim 1, wherein it is self-supported.

16. The polymer electrolyte according to claim 1, wherein it is in the form of a film, the thickness of which is between 1 µm and 1 mm.

17. The polymer electrolyte according to claim 1, wherein it is transparent.

18. A process for producing a polymer electrolyte as claimed in claim 1, this process comprising the steps of:
obtaining a precursor composition comprising the precursor(s) of said silicone polymer, if necessary a polymerization and/or crosslinking catalyst, said fluorinated salt and said solvent;
then
subjecting said precursor composition to a polymerization and/or crosslinking treatment.

19. A process for producing a polymer electrolyte as claimed in claim 1, this process comprising the steps of:
obtaining a precursor composition comprising the precursor(s) of said silicone polymer, if necessary a polymerization and/or crosslinking catalyst, and said fluorinated salt;
subjecting said precursor composition to a polymerization and/or crosslinking treatment in order to obtain said silicone polymer;
impregnating said silicone polymer with the solvent.

20. A precursor composition of a polymer electrolyte as claimed in claim 1, comprising the precursor(s) of said silicone polymer, said fluorinated salt, said solvent, and optionally a polymerization and/or crosslinking catalyst.

21. A battery comprising an anode, a cathode and a polymer electrolyte as defined in claim 1.

22. An electronic display device comprising at least one polymer electrolyte as defined in claim 1.

* * * * *